United States Patent

Santana-Gallego et al.

(10) Patent No.: US 8,714,589 B2
(45) Date of Patent: May 6, 2014

(54) DEVICE FOR PROTECTING AN INDIVIDUAL SITTING ON A SEAT, A SEAT, AND A VEHICLE

(71) Applicants: Eurocopter, Marignane, Cedex (FR); Eurocopter Deutschland GmbH, Donauworth (DE); Schroth Safety Products GmbH, Arnsberg (DE); Fischer + Entwicklugen GmbH & Co KG, Landshut (DE)

(72) Inventors: Tomas Santana-Gallego, Aix en Provence (FR); Ulf Gruene, Ense (DE); Roland Bauer, Landshut (DE)

(73) Assignees: Airbus Helicopters, Marignane Cedex (FR); Airbus Helicopters Deutschland, Donauworth (DE); Schroth Safety Products GmbH, Arnsberg (DE); Fischer + Entwicklungen GmbH & Co KG, Landshut (DE)

( * ) Notice: Subject to any disclaimer, the term of this patent is extended or adjusted under 35 U.S.C. 154(b) by 0 days.

(21) Appl. No.: 13/710,538

(22) Filed: Dec. 11, 2012

(65) Prior Publication Data

US 2013/0147242 A1  Jun. 13, 2013

(30) Foreign Application Priority Data

Dec. 13, 2011 (EP) .................................. 11290574

(51) Int. Cl.
*B60R 21/18* (2006.01)
(52) U.S. Cl.
USPC ....................................... 280/733; 280/801.1
(58) Field of Classification Search
USPC ............ 280/733, 801.1, 801.2, 808; 297/468, 297/483
See application file for complete search history.

(56) References Cited

U.S. PATENT DOCUMENTS

| 4,231,616 A | 11/1980 | Painter |
| 4,911,381 A | 3/1990 | Cannon |
| 5,085,412 A | 2/1992 | Peterson |

(Continued)

FOREIGN PATENT DOCUMENTS

| DE | 102009040641 A1 | 4/2010 |
| EP | 1031472 A2 | 8/2000 |

(Continued)

OTHER PUBLICATIONS

Search Report and Written Opinion; Application No. EP 11290574; dated Aug. 23, 2012.

*Primary Examiner* — Faye M. Fleming
(74) *Attorney, Agent, or Firm* — Brooks Kushman P.C.

(57) ABSTRACT

A protection device (10) having a set (11) of protection inflatable members (15, 20, 25) including left and right inflatable lateral means (20, 25) that are suitable for co-operating respectively with the left and right shoulder straps (6, 7), said device (10) possessing an inflator (30) for inflating said protection inflatable members (15, 20, 25). The device includes a headrest (35) carrying a nape airbag (15) of said set of inflatable members (15, 20, 25), the nape airbag (15) including one passage (16, 17) per inflatable lateral means (20, 25) in order to convey fluid to each inflatable lateral means (20, 25), said headrest (35) being provided with a hollow support (40) carrying said inflator (30) and with a fluid diffusion box (50) arranged in the nape airbag (15) so as to convey a fluid from the inflator (30) to the nape airbag (15) and to the inflatable lateral means (20, 25).

16 Claims, 4 Drawing Sheets

(56) References Cited

U.S. PATENT DOCUMENTS

| | | |
|---|---|---|
| 5,282,648 A | 2/1994 | Peterson |
| 5,464,246 A | 11/1995 | Castro |
| 5,609,396 A | 3/1997 | Loxton |
| 5,871,231 A | 2/1999 | Richards |
| 5,928,300 A | 7/1999 | Rogers |
| 6,062,143 A | 5/2000 | Grace |
| 6,126,194 A | 10/2000 | Yaniv |
| 6,203,058 B1 | 3/2001 | Elqadah |
| 6,224,019 B1 | 5/2001 | Peterson |
| 6,237,945 B1 | 5/2001 | Aboud |
| 6,336,653 B1 | 1/2002 | Yaniv |
| 6,336,656 B1 | 1/2002 | Romeo |
| 6,378,897 B1 | 4/2002 | Butters |
| 6,378,898 B1 | 4/2002 | Lewis |
| 6,505,853 B2 | 1/2003 | Brannon |
| 6,508,487 B2 | 1/2003 | Koster |
| 6,547,273 B2 | 4/2003 | Grace |
| 6,585,289 B1 | 7/2003 | Hammer |
| 6,705,641 B2 * | 3/2004 | Schneider et al. ............ 280/733 |
| 6,857,136 B1 | 2/2005 | Bradley |
| 7,665,761 B1 | 2/2010 | Green |
| 7,874,590 B1 | 1/2011 | Schubert |
| 7,980,590 B2 * | 7/2011 | Foubert et al. ................ 280/733 |
| 8,016,318 B2 * | 9/2011 | Nezaki .......................... 280/733 |
| 8,104,790 B2 * | 1/2012 | Nezaki .......................... 280/733 |
| 8,480,127 B2 * | 7/2013 | Rathmann-Ramlow et al. .............................. 280/733 |
| 2002/0153715 A1 * | 10/2002 | Namiki ......................... 280/733 |
| 2003/0168837 A1 | 9/2003 | Schneider |
| 2007/0001435 A1 | 1/2007 | Gray |
| 2008/0030010 A1 | 2/2008 | Millet Lopez |
| 2009/0200775 A1 | 8/2009 | Sugimoto |

FOREIGN PATENT DOCUMENTS

| | | |
|---|---|---|
| EP | 1797782 A1 | 6/2007 |
| EP | 2050627 A1 | 4/2009 |
| FR | 2825959 A1 | 12/2002 |
| GB | 230687 A | 3/1925 |

\* cited by examiner

DEVICE FOR PROTECTING AN INDIVIDUAL SITTING ON A SEAT, A SEAT, AND A VEHICLE

CROSS REFERENCE TO RELATED APPLICATIONS

This application claims priority to European patent application No. 11 290574.0 filed Dec. 13, 2011 the disclosure of which is incorporated in its entirety by reference.

BACKGROUND OF THE INVENTION (1) Field of the Invention

The present invention relates to a device for protecting an individual sitting on a seat, to a seat, and to a vehicle. More particularly, the invention relates to a device for protecting and retaining a passenger in an aircraft.

(2) Description of Related Art

In order to improve the safety of a vehicle passenger, it is known to use devices implementing a retention harness in order to hold an individual against a seat. Such a retention harness is sometimes referred to as a "safety belt". The retention harness comprises straps, possibly retractable straps, that are fastened to the vehicle at least three points.

On aircraft, it is common practice to provide harnesses with four or five attachment points and including in particular left and right shoulder straps that are fastened to a buckle.

In addition, it is also known to implement inflatable protection devices including inflatable cushions known as "airbags".

Document U.S. Pat. No. 7,665,761 describes a retention harness having four attachment points that is fitted with an inflatable protection device. That inflatable protection device is provided in particular with an inflatable airbag arranged on a shoulder strap of the retention harness. In addition, a lateral airbag is provided with a first chamber attached to the shoulder strap and a second chamber communicating with the first chamber. The device also includes an inflator connected to the first chamber by a pipe. If necessary, the inflator injects a fluid into the first chamber in order to inflate it, the second chamber then being inflated via the first chamber. It should be observed that the second chamber is L-shaped when inflated. Document US 2007/0001435 describes an inflatable protection airbag arranged on a strap of a harness for retaining an individual. Since the strap is movable, the protection airbag slides along the strap. Thus, a buckle of the retention harness includes means for conveying fluid to the protection airbag. It can be understood that it may be difficult to convey a fluid to a protection airbag, particularly when the protection airbag and/or the straps of a retention harness receiving such an airbag are movable.

Furthermore, it may be difficult to arrange a protection device on a pre-existing seat that was not designed for this purpose.

It should be observed that the technological background includes in particular document U.S. Pat. No. 5,609,396, which describes rotary means for fastening a retention harness strap to a seat.

The following documents are also known: U.S. Pat. No. 6,547,273, U.S. Pat. No. 6,857,136, U.S. Pat. No. 5,085,412, U.S. Pat. No. 6,062,143, U.S. Pat. No. 6,378,898, U.S. Pat. No. 6,585,289, U.S. Pat. No. 4,911,381, U.S. Pat. No. 6,508,487, U.S. Pat. No. 6,505,853, U.S. Pat. No. 6,378,897, U.S. Pat. No. 6,336,656, U.S. Pat. No. 6,336,653, U.S. Pat. No. 6,224,019, U.S. Pat. No. 6,126,194, U.S. Pat. No. 5,871,231, U.S. Pat. No. 6,203,058, U.S. Pat. No. 5,282,648, U.S. Pat. No. 5,464,246, U.S. Pat. No. 5,928,300, U.S. Pat. No. 7,874,590, and GB 230 687.

BRIEF SUMMARY OF THE INVENTION

An object of the present invention is to propose a device that is effective in protecting an individual sitting on a seat, the device being easily installed on existing seats and in particular on seats that are provided with a system for retracting straps of a retention harness.

The invention thus provides a device for protecting an individual held on a seat by means of a retention harness having left and right shoulder straps. According to the invention, the device comprises a set of protection inflatable members of the airbag type, the set of protection inflatable members including left and right inflatable lateral means suitable for co-operating respectively with the left and right shoulder straps and being arranged on said straps, the device possessing an inflator to inflate the protection inflatable members.

The device is remarkable in particular in that it comprises a headrest carrying an inflatable nape airbag forming part of the set of inflatable members, the nape airbag having one passage per inflatable lateral means for conveying a fluid to each inflatable lateral means, the headrest being provided with a hollow support carrying the inflator and a fluid diffusion box arranged in the nape airbag in order to convey fluid from the inflator to the nape airbag and to the inflatable lateral means.

Thus, the device may be installed easily on a seat by placing the headrest on the seat. Additionally, the maintenance of the device is also easily achieved.

Furthermore, it can be seen that the inflatable members are fed with fluid by an inflator through the hollow support and the diffusion box. Consequently, the device does not need to have any pipes for conveying fluid from the inflator to a protection inflatable member. This results in a device presenting non-negligible compactness. Moreover, it is easy to integrate the device on multiple seats. The device serves in particular to make it easy to feed inflatable members arranged on straps, and more particularly on retractable straps, without it being necessary to implement a relatively complicated belt buckle to connect an inflator to inflatable members.

Furthermore, the left and right inflatable lateral means may be inflated by the inflator so as to extend on either side of an individual, the nape airbag serving to protect the individual's nape for example in case of occupant rebound.

Also, it should be observed that since the inflatable lateral means are situated on the shoulder straps and the nape airbag is situated close to the individual's neck, the invention proposes arranging protection inflatable members close to the individual's body.

Therefore, it can be understood that the combination of these inflatable members provides an individual sitting on the seat with good protection.

The present invention may also include one or more of the following additional characteristics.

For example, each inflatable lateral means may comprise a bottom airbag and a top airbag. The bottom airbag may communicate with the nape airbag and the associated top airbag, or else the top airbag may communicate with the nape airbag and with the associated bottom airbag. Eventually, each inflatable lateral means can include further airbag.

The function of the nape airbag is then to connect the diffusion box to the inflatable lateral means in order to ensure they are deployed and to hold the set of inflatable members against the headrest. Furthermore, the nape airbag protects the individual sitting on the seat so as to avoid any rebound of the individual against the headrest.

Each bottom airbag has also a function of holding the top airbag in the required position or indeed of producing a pre-tension on the associated shoulder strap before the individual begins to move forwards under the effect of inertial forces, during a crash for example. Furthermore, each bottom airbag limits the movements of the individual and provides protection against an impact between the individual and a foreign body. Finally, each bottom airbag allows to connect the top airbag to the nape airbag so that the top airbag can be inflated. Under such circumstances, the top airbag is used in particular to protect the individual against lateral impacts, and more particularly serves to protect the individual's head.

In another alternative, each inflatable lateral means comprises a top airbag only. This embodiment is advantageous when the manufacturer is of the opinion that it is not essential to establish pre-tension in the shoulder straps by using the inflatable lateral means, e.g. if such pre-tension is obtained by auxiliary means or if such pre-tension is of secondary importance. Under such circumstances, it is possible to use an inflator that is optimized compared with the preceding embodiments, since the volume of fluid needed for inflating the set of airbags is minimized.

According to another aspect, the set of protection inflatable members is arranged in a cover including zones of weakness to allow the protection inflatable members to be deployed. Under normal conditions of use, the inflatable members are folded inside the cover and they are attached to the headrest either directly or indirectly. However, under certain conditions, the inflator inflates the inflatable members, which are thus deployed out from the cover, the cover being torn in the zones of weakness that are pre-established by the manufacturer.

Furthermore, the device may include one slide means per inflatable lateral means in order to enable relative movement between the inflatable lateral means and a shoulder strap co-operating with the inflatable lateral means, each slide means being secured to inflatable lateral means and having a shoulder strap passing therethrough. So, a shoulder strap can slide through a slide means.

Consequently, when the individual sits on the seat, it is possible to pull on the shoulder straps in order to latch them in a buckle without moving the inflatable lateral means arranged on said shoulder straps. The lateral means then remain in the required position.

In addition, the individual can move forwards without being hindered in those movements.

Such slide means include, for example, a base carrying two guides suitable for having a shoulder strap passing therethrough. The base may be secured to the inflatable lateral means and to the cover, where suitable. When each inflatable lateral means includes a bottom airbag and a top airbag, the slide means may be arranged between the bottom airbag and the top airbag. The bottom airbag is then in contact with the shoulders and the chest of the individual sitting on the seat once deployed.

It should be observed that in a preferred embodiment, a fusible section is arranged between each slide means and the headrest. So, each slide means can be attached by means of a fusible section to the headrest, a fusible section of the base or a fusible section arranged between the base and the headrest for example.

Thus, when the inflator releases a fluid, the fluid inflates the nape airbag and the inflatable lateral means. This inflation tends to press the nape airbag and the inflatable lateral means against the individual. When the individual's chest moves forwards under the effect of inertial forces, the individual then exerts a force on the device, which leads to the fusible zone breaking. The inflatable lateral means then advantageously move together with the individual's chest, unlike the nape airbag which remains attached to the headrest.

At the end of this forward movement, the individual moves rearwards back towards the seat. The nape airbag then tends to protect the individual against an impact with the headrest, in particular.

In another aspect, the headrest may include left and right rotary connections respectively passing left and right shoulder straps. Under such circumstances, each strap may be slightly "rotated" improving the strap-occupant body fitting. Afterwards, each slide means is for example attached by a fusible section to a rotary connection, each strap sliding in a rotary connection.

In addition, the headrest optionally includes left and right retractors respectively carrying left and right shoulder straps. In another variant, left and right retractors can be secured to the seat backrest. The headrest of the device then comprises both the shoulder straps of the retention harness and the protection inflatable members.

Furthermore, the device may include activation means for activating the inflator to cause the protection inflatable members to be inflated under predetermined conditions.

For example, the activation means may be an independent electrical member suitable for actuating the inflator in the event of a crash of the vehicle fitted with the invention. The predetermined conditions may be for example threshold accelerations suitable for activating a mechanical actuator.

Furthermore, the device may include inhibit means for inhibiting the activation means, e.g. for the purpose of deactivating the device during maintenance operations.

In another aspect, in order to optimize the compactness of the device, in a variant, the hollow support comprises support means fastened to the headrest and carrying a jaw suitable for holding the inflator. The jaw comprises first and second rings defining an annular diffusion groove facing at least one diffusion orifice of the inflator, the diffusion groove communicating with a duct formed in the support means and leading to the diffusion box.

The invention also provides a seat provided with a backrest and a harness for retaining an individual, the harness comprising left and right shoulder straps, said seat including a device for protecting the individual. This device has a set of protection inflatable members including inflatable left and right inflatable lateral means co-operating respectively with the left and right shoulder straps, said device possessing an inflator for inflating said protection inflatable members.

Said seat is remarkable in particular in that the device is of the above-described type, the device comprising a headrest carrying a nape airbag of said set of inflatable members, the nape airbag having one passage per inflatable lateral means for conveying a fluid to each inflatable lateral means, said headrest being provided with a hollow support carrying said inflator and a fluid diffusion box arranged in the nape airbag in order to convey a fluid from the inflator to the nape airbag and to the inflatable lateral means.

Finally, the invention provides a vehicle including such a seat.

BRIEF DESCRIPTION OF THE SEVERAL
VIEWS OF THE DRAWINGS

The invention and its advantages appear in greater detail from the context of the following description of embodiments given by way of illustration with reference to the accompanying figures, in which.

Figure 3:
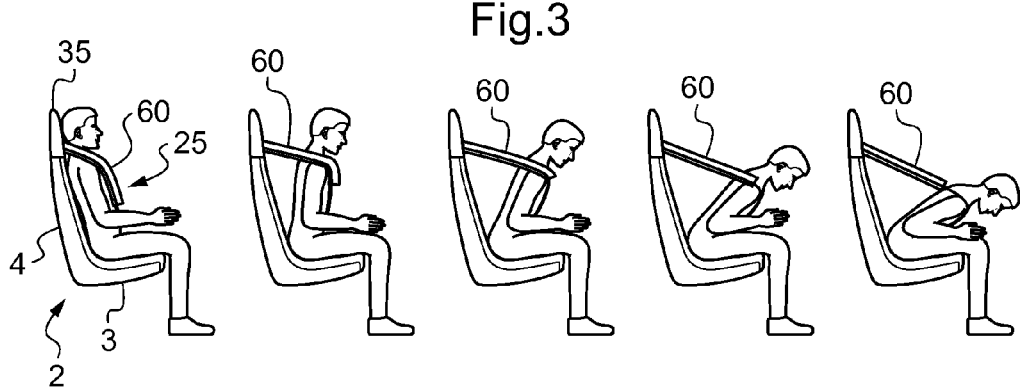
Figure 5:
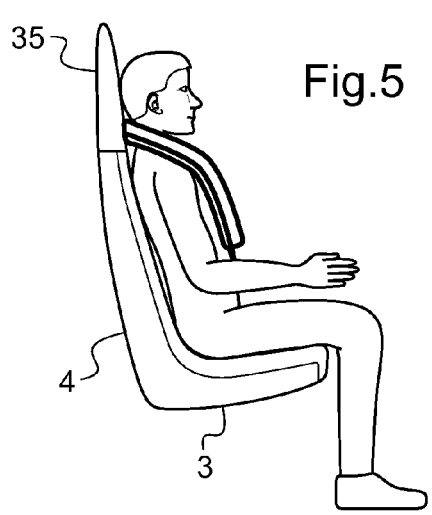
Figure 6:
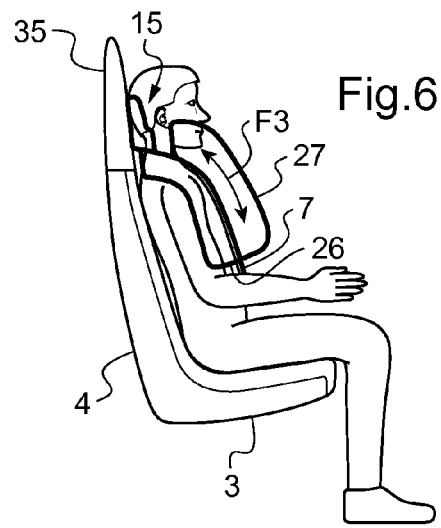
Figure 7:
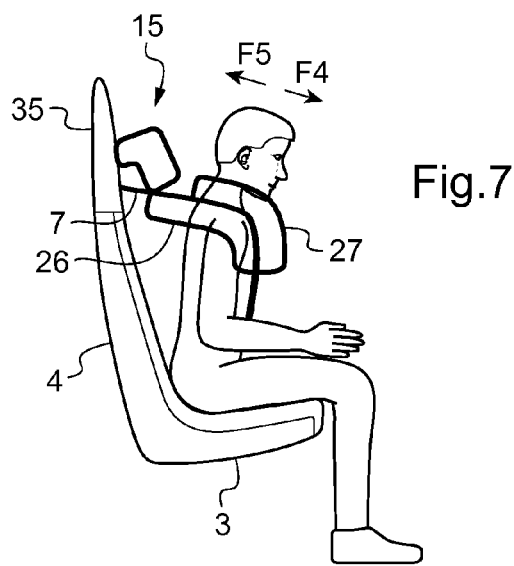
Figure 4:
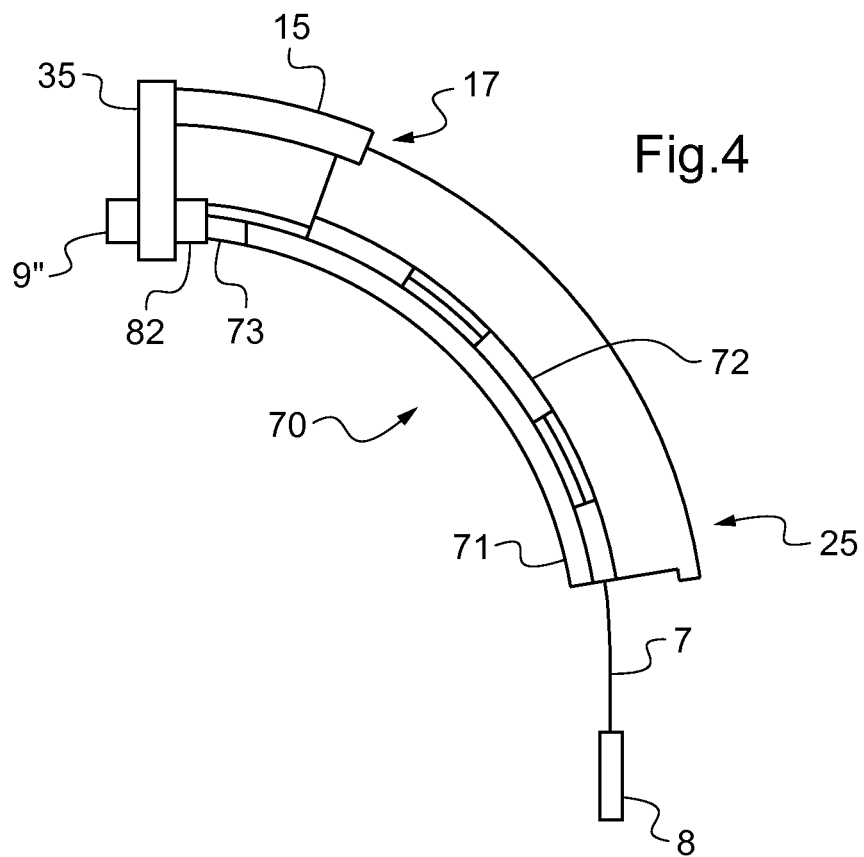

FIG. 3 comprises diagrams explaining the operation of slide means;

FIG. 4 shows slide means of the invention;

FIGS. 5 to 7 are diagrams explaining the operation of the device; and

Figure 8:
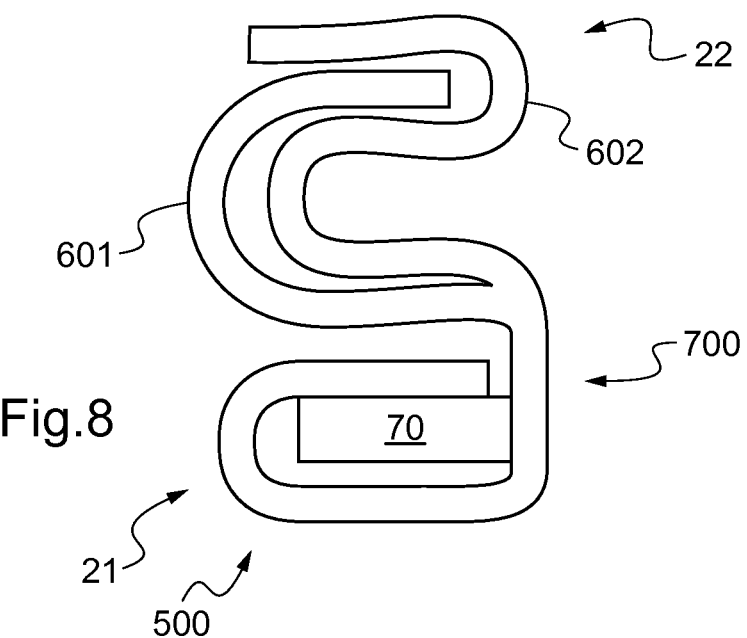

FIG. 8 is a section of inflatable lateral means in a preferred embodiment.

Elements that are shown in more than one of the figures always keep the same references.

DETAILED DESCRIPTION OF THE INVENTION

Figure 1:
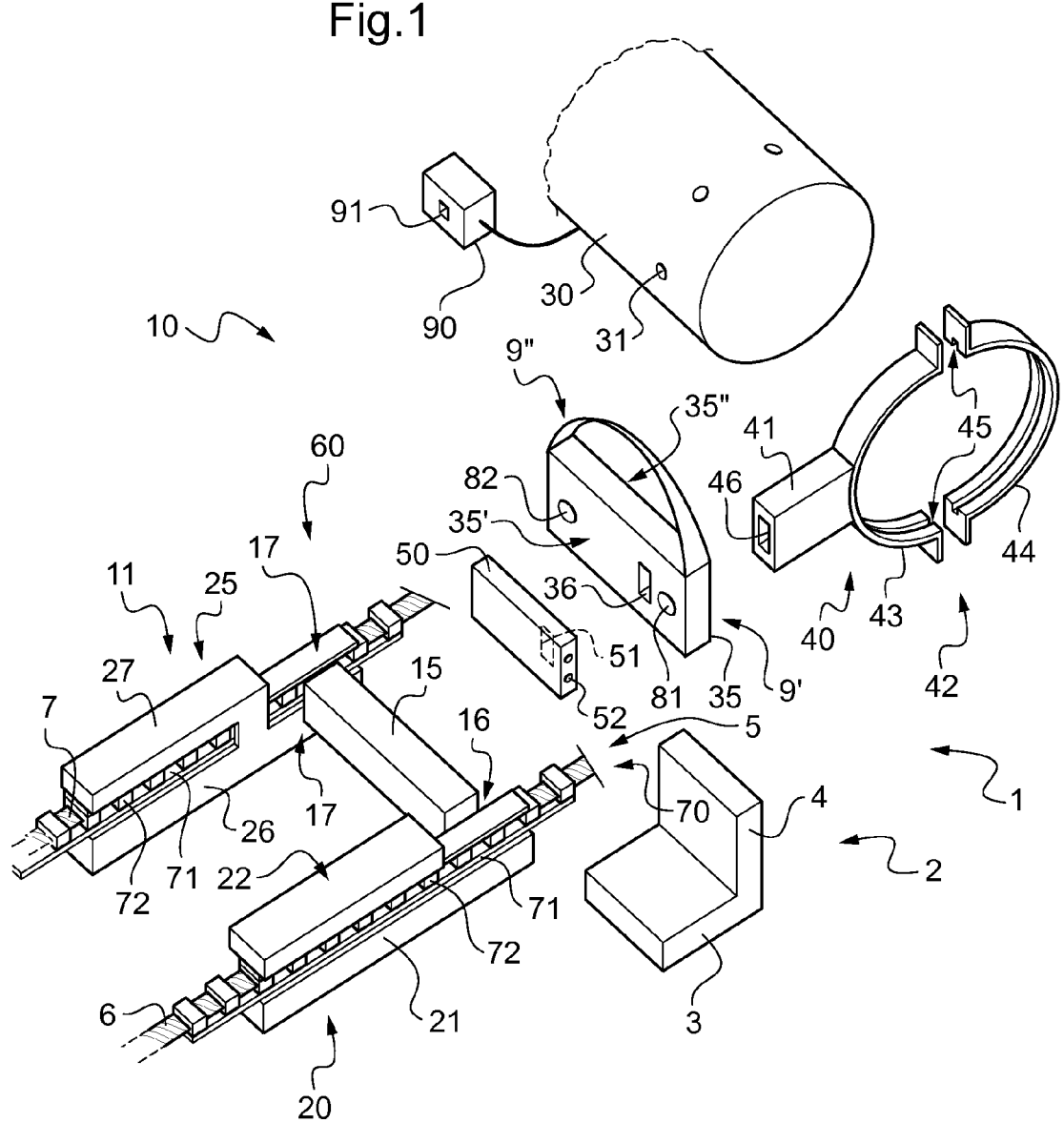
FIG. 1 is an exploded view of a device for protecting an individual sitting on a vehicle seat.

FIG. 1 shows a vehicle 1 having at least one seat 2 of the invention. It should be observed that various elements of the vehicle 1 having no direct association with the invention are not shown in order to avoid overloading the figure.

The seat 2 has a seat pan 3 and a seat backrest 4 suitable for settling an individual. The seat 2 is also fitted with a device 10 for protecting that individual following an incident, such as a crash.

Figure 2:
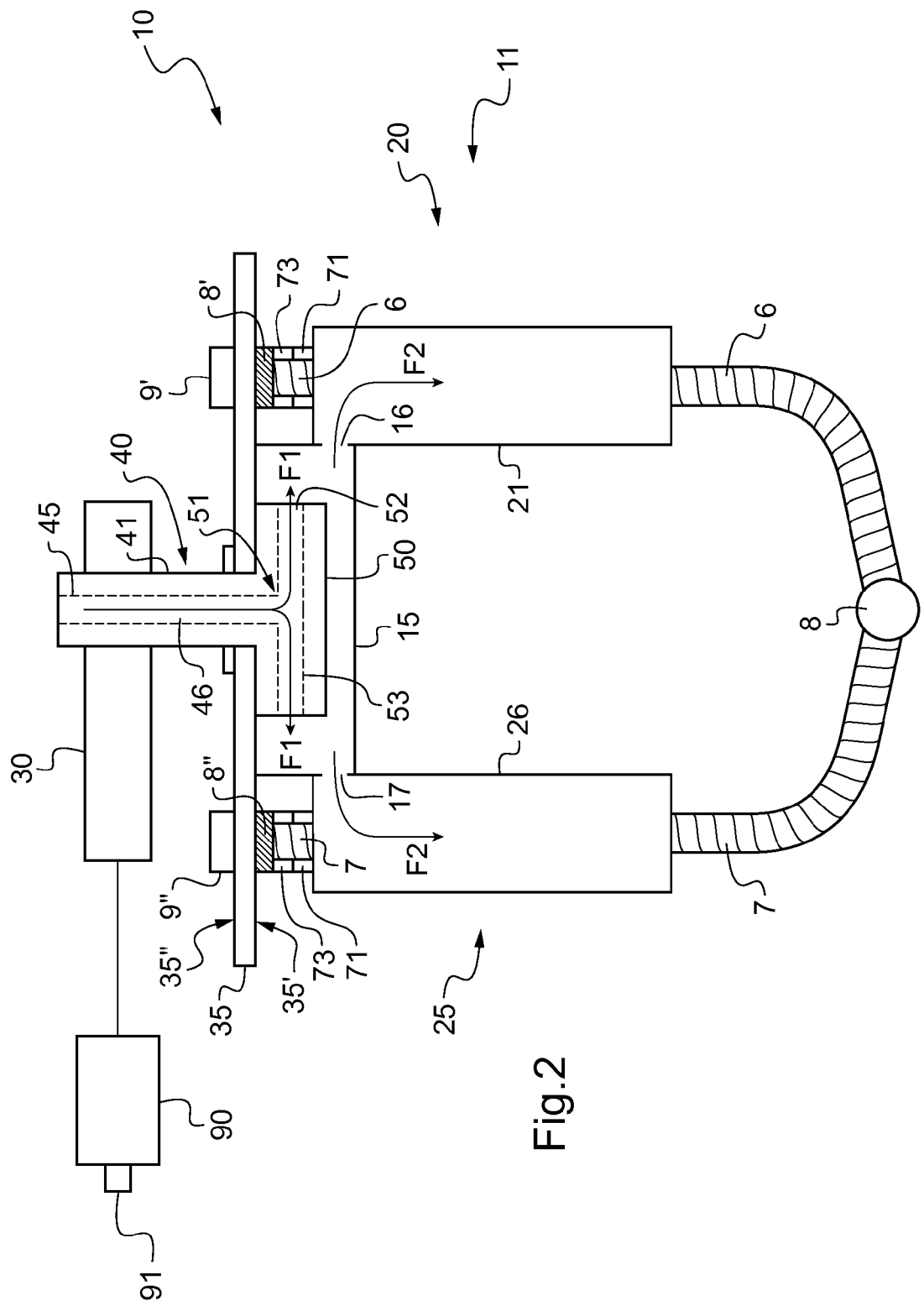
FIG. 2 is a diagram explaining said device.

Under such circumstances, the seat 2 includes a retention harness 5 having a left shoulder strap 6 and a right shoulder strap 7 suitable for co-operating with a closure buckle 8 that can be seen in FIG. 2.

As explained below, the left and right shoulder straps 6 and 7 may be incorporated in the protection device 10 in order to make it easier to incorporate the device 10.

FIG. 1 shows the various elements of the device 10.

Thus, the device 10 includes a set 11 of inflatable members that inflate under conditions predetermined by the manufacturer in order to protect the individual sitting on the seat, and in particular the individual's head. The set 11 of protection inflatable members 15, 20, 25 is optionally arranged in a cover 60 not shown in FIG. 1, the cover 60 including weak zones for allowing the protection inflatable members to be deployed.

The device 10 thus includes a headrest 35 suitable for being attached on the backrest 4 of a seat 2. The set 11 of inflatable members is fastened to the headrest 35.

In order to inflate the set 11 of inflatable members under certain predetermined conditions, the device 10 possesses an inflator 30.

The inflator 30 may contain helium under pressure that is retained in a chamber by a membrane. By means of an electric current, it is possible to smelt down the membrane so as to allow the contained fluid it retains thereby to escape from the inflator via delivery orifices 31.

For this purpose, the device 10 may include activation means 90 for delivering such an electric current to the inflator under the predetermined conditions. As an example, the activation means 90 may comprise a battery delivering the required electric current to the inflator when sensors detect said conditions.

It can be understood that it is possible to use any type of inflator and where appropriate activation means for inflating the set 11 of inflatable members by means of a fluid.

The activation means may be arranged on a stand of the seat 2 and may include inhibit means 91.

In order to convey the fluid from the inflator 30 to the set 11 of inflatable members, the device 10 is provided with delivery pipes in particular in order to facilitate installation and maintenance of the device.

Consequently, the device includes a hollow support 40 co-operating with the headrest 35, the inflator 30, and a diffusion box 50.

The hollow support 40 then serves firstly to fasten the inflator to the headrest and secondly to convey the fluid from the inflator to the inflatable members.

The hollow support 40 includes support means 41 co-operating with a jaw 42. The jaw 42 has a first ring 43 secured to the support means 41 and a second ring 44.

The first ring 43 may then be fastened to the second ring 44 by conventional means in order to be clamped on the inflator 30.

Furthermore, the jaw 42 includes an annular groove 45, arranged by way of example in the first ring and in the second ring. The annular groove also communicates with a duct 46 in the support means 41.

The annular groove 45 is placed in register with diffusion orifices 31 of the inflator 30. The fluid escaping from the inflator 30 via the diffusion orifices 31 then passes into the annular groove 45 and then into the duct 46.

Consequently, the headrest includes a hole 36 co-operating with the support means 41 and an inlet orifice 51 of the diffusion box 50, the diffusion box 50 being fastened to a first base 35' of the headrest.

The diffusion box 50 then includes outlet orifices 52 communicating with the inlet orifice 51 via internal pipes 53, the outlet orifices leading to the set 11 of inflatable members.

In a first variant, the support means 41 is fastened to a second face 35" of the headrest so that the duct 46 coincides with a hole 36.

In a second variant, the support means 41 passes through the hole 36 so that the duct 46 penetrates into the inlet orifice 51. Fastener means may also fasten the support means 41 to the second face 35".

Furthermore, the set 11 of inflatable members includes a nape airbag 15 in which the diffusion box 50 is placed. The nape airbag 15 may be attached directly to the headrest or indirectly via the diffusion box 50.

The set 11 also includes left inflatable lateral means 20 and right inflatable lateral means 25 that co-operate respectively with the left shoulder strap 6 and the right shoulder strap 7.

Such inflatable lateral means are sometimes referred to as a seat belt airbag.

Under such circumstances, the nape airbag 15 includes at least one left passage 16 and at least one right passage 17 for conveying the inflation fluid respectively to the left lateral means 20 and to the right lateral means 25.

Each inflatable lateral means 20, 25 also includes a bottom airbag 21, 26 and a top airbag 22, 27, the bottom airbag 21, 26 of a given inflatable lateral means communicating with the nape airbag 15 and with the top airbag 22, 27 associated with the inflatable lateral means.

In a variant that is not shown, the top airbags may be joined together with a sealed partition possibly separating the two top airbags. Similarly, in a variant not shown, the bottom airbags may be joined together with a sealed partition possibly separating the two bottom airbags.

The device 10 may also include one slide means 70 per inflatable lateral means 20, 25. Each slide means allows relative movement between the inflatable lateral means 20, 25 and a shoulder strap 6, 7 co-operating with the inflatable lateral means 20, 25.

With reference to FIG. 3, except for the case the inflatable members are inflated, when an individual sitting on the seat moves, the inflatable lateral means remain fastened to the headrest 35. In contrast, each strap is free to move relative to the associated inflatable lateral means.

FIG. 4 shows slide means 70.

The slide means may comprise an elongate base 71 made of flexible material. The base is optionally attached to an airbag of an inflatable lateral means and to a cover of the device.

Furthermore, the base 71 carries several guides 72 suitable for having a shoulder strap sliding therethrough.

Finally, the base 71 is attached to the headrest, directly or indirectly, by a fusible section 73.

In the FIG. 4, the variant shown has inflatable lateral means 25 provided solely with a top airbag connected to a nape airbag.

Nevertheless, with reference to FIG. 1, provision may be made for a bottom airbag, with the slide means being arranged, for example, between the bottom airbag and the top airbag.

The bottom airbag or the top airbag may then be connected to the nape airbag. It is advantageous to connect the bottom airbag to the nape airbag and the top airbag to the bottom airbag so that the bottom airbag is inflated quickly in order to exert pre-tension on the associated strap.

With reference to FIG. 2, it should be observed that the headrest advantageously includes a left retractor 9' and a right retractor 9" on its second face 35", the retractors respectively carrying a left shoulder strap 6 and a right shoulder strap 7.

Furthermore, the headrest 35 may optionally include a left rotary connection 81 and a right rotary connection 82 on its first face 35', the rotary connections having respective left and right shoulder straps 6 and 7 sliding through. Thus, the fusible section 73 of each slide means 70 is optionally attached indirectly to the headrest 35 via a rotary connection 81, 82.

Such rotary connection can also be attached to the seat backrest.

Under predetermined conditions, the inflator 30 releases a fluid via its diffusion orifices 31.

The fluid passes through the hollow support 40, and then through the diffusion box 50 in order to expand in the nape airbag 15 as represented by arrows F1, thereby inflating the nape airbag 15.

In parallel, some of the fluid passes from the nape airbag 15 to the inflatable lateral means 20, 25 by passing through narrow passages 16, 17 of the nape airbag that are provided for this purpose.

More particularly, the fluid penetrates into the bottom airbags 21, 26 and then enters the top airbags 22, 27, where appropriate.

Consequently, the device 10 changes from a "normal" first state shown in FIG. 5, to an "emergency" state shown in FIG. 6.

At this stage, the inflatable lateral means 20, 25, and in particular the bottom airbags 21, 26 exert a friction force on the individual as shown by arrow F3.

Given inertial forces, the individual's chest moves forwards along arrow F4.

Friction forces tend to hold the inflatable lateral means against the chest, so a fraction force is exerted on the fusible zones 73 of the slide means 70. As from a threshold, the fusible zones break. This results in the inflatable lateral means moving together with the individual's chest away from the seat backrest 4 and the headrest 35 so as to continue to protect the individual.

In contrast, the nape airbag remains attached to the headrest 35.

Consequently, when the individual's chest returns towards the seat backrest 4 in the direction of arrow F5, at the end of its forward movement, the nape airbag remains in position to minimize any contact between the individual's nape and the headrest 35.

Furthermore, FIG. 8 is a section view of inflatable lateral means in one embodiment at the level of an intermediate zone.

In this embodiment, the inflatable lateral means comprises a bottom airbag having a single bottom pocket 500 and a top airbag having two top pockets 601, 602.

The bottom pocket and the two top pockets are connected together at a narrow intermediate zone 700. The fluid coming from the inflation means can then pass from the bottom airbag to the top airbag via the intermediate zone 700.

It should also be observed that the slide means 70 may be attached to the intermediate zone, the slide means advantageously being located between two parts of the bottom airbag.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A device for protecting an individual held on a seat by means of a harness including a left shoulder strap and a right shoulder strap, said device having a set of protection inflatable members including left and right inflatable lateral means that are suitable for co-operating respectively with the left and right shoulder straps, said device possessing an inflator for inflating said protection inflatable members, and a headrest carrying a nape airbag of said set of inflatable members, the nape airbag including one passage per inflatable lateral means in order to convey fluid to each inflatable lateral means, said headrest being provided with a hollow support carrying said inflator and with a fluid diffusion box arranged in the nape airbag in order to convey a fluid from the inflator to the nape airbag and to the inflatable lateral means, wherein said device includes one slide means per inflatable lateral means in order to enable relative movement between said inflatable lateral means and a shoulder strap co-operating with said inflatable lateral means, each slide means being secured to an inflatable lateral means.

2. A device according to claim 1, wherein each inflatable lateral means comprises a bottom airbag and a top airbag.

3. A device according to claim 1, wherein said set of protection inflatable members is arranged in a cover including zones of weakness to allow the protection inflatable members to be deployed.

4. A device according to claim 1, wherein said device is devoid of pipes for conveying fluid from the inflator to a protection inflatable member.

5. A device according to claim 1, wherein said slide means include a base carrying at least two guides suitable for having a shoulder strap passing therethrough.

6. A device according claim 1, wherein a fusible section is arranged between each slide means and the headrest.

7. A device according to claim 6, wherein said slide means are attached by means of a fusible section to said headrest.

8. A device according to claim 6, wherein said headrest includes left and right rotary connections respectively passing left and right shoulder straps, each slide means being fastened by a fusible section to a rotary connection.

9. A device according to claim 1, wherein said headrest includes left and right retractors respectively carrying left and right shoulder straps.

10. A device according to claim 1, wherein said device includes activation means for activating said inflator to cause the protection inflatable members to be inflated under predetermined conditions.

11. A device according to claim 10, wherein said device includes inhibit means for inhibiting said activation means.

12. A device according to claim 1, wherein said hollow support includes support means fastened to the headrest and carrying a jaw suitable for holding said inflator, said jaw comprising first and second rings defining an annular diffusion groove facing at least one diffusion orifice of said inflator, said annular diffusion groove communicating with a duct formed in said support means and leading to said diffusion box.

13. A seat provided with a backrest and a harness for retaining an individual, the harness comprising left and right shoulder straps, said seat including a device for protecting the individual, which device has a set of protection inflatable members including left and right inflatable lateral means co-operating respectively with the left and right shoulder straps, said device possessing an inflator for inflating said protection inflatable members, wherein said device is a device according to claim 1, the device having a headrest carrying a nape airbag of said set of inflatable members, the nape airbag having one passage per inflatable lateral means for conveying a fluid to each inflatable lateral means, said headrest being provided with a hollow support carrying said inflator and a fluid diffusion box arranged in the nape airbag in order to convey a fluid from the inflator to the nape airbag and to the inflatable lateral means.

14. A vehicle, wherein said vehicle includes at least one seat according to claim 13.

15. A device for protecting an individual held on a seat by means of a harness including a left shoulder strap and a right shoulder strap, said device having a set of protection inflatable members including left and right inflatable lateral means that are suitable for co-operating respectively with the left and right shoulder straps, said device possessing an inflator for inflating said protection inflatable members, and a headrest carrying a nape airbag of said set of inflatable members, the nape airbag including one passage per inflatable lateral means in order to convey fluid to each inflatable lateral means, said headrest being provided with a hollow support carrying said inflator and with a fluid diffusion box arranged in the nape airbag in order to convey a fluid from the inflator to the nape airbag and to the inflatable lateral means, wherein said device includes one slide means per inflatable lateral means in order to enable relative movement between said inflatable lateral means and a shoulder strap co-operating with said inflatable lateral means, each slide means being secured to an inflatable lateral means;

wherein said device includes activation means for activating said inflator to cause the protection inflatable members to be inflated under predetermined conditions; and wherein said device includes inhibit means for inhibiting said activation means.

16. A device for protecting an individual held on a seat by means of a harness including a left shoulder strap and a right shoulder strap, said device having a set of protection inflatable members including left and right inflatable lateral means that are suitable for co-operating respectively with the left and right shoulder straps, said device possessing an inflator for inflating said protection inflatable members, and a headrest carrying a nape airbag of said set of inflatable members, the nape airbag including one passage per inflatable lateral means in order to convey fluid to each inflatable lateral means, said headrest being provided with a hollow support carrying said inflator and with a fluid diffusion box arranged in the nape airbag in order to convey a fluid from the inflator to the nape airbag and to the inflatable lateral means, wherein said device includes one slide means per inflatable lateral means in order to enable relative movement between said inflatable lateral means and a shoulder strap co-operating with said inflatable lateral means, each slide means being secured to an inflatable lateral means; and wherein said hollow support includes support means fastened to the headrest and carrying a jaw suitable for holding said inflator, said jaw comprising first and second rings defining an annular diffusion groove facing at least one diffusion orifice of said inflator, said annular diffusion groove communicating with a duct formed in said support means and leading to said diffusion box.

* * * * *